United States Patent
Ozeki et al.

(10) Patent No.: US 8,248,032 B2
(45) Date of Patent: *Aug. 21, 2012

(54) CHARGING SYSTEM FOR PRIORITIZING LOAD CONSUMPTION IN A NOTEBOOK COMPUTER

(75) Inventors: Norihito Ozeki, Yamato (JP); Noritoshi Yamasaki, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 290 days.

This patent is subject to a terminal disclaimer.

(21) Appl. No.: 12/464,960

(22) Filed: May 13, 2009

(65) Prior Publication Data
US 2009/0322287 A1    Dec. 31, 2009

(30) Foreign Application Priority Data
Jun. 25, 2008  (JP) .................................. 2008-165380

(51) Int. Cl.
*H02J 7/00*   (2006.01)
(52) U.S. Cl. .. 320/124; 320/125; 320/160; 320/DIG. 11
(58) Field of Classification Search ............... 307/31–35, 307/38, 39, 41; 320/124, DIG. 11, 125, 160
See application file for complete search history.

(56) References Cited

U.S. PATENT DOCUMENTS

| | | | | |
|---|---|---|---|---|
| 3,894,244 A * | 7/1975 | Hill | ............................ | 307/16 |
| 4,034,233 A * | 7/1977 | Leyde | ........................... | 700/295 |
| 5,200,685 A * | 4/1993 | Sakamoto | ................... | 320/103 |
| 6,392,383 B1 * | 5/2002 | Takimoto et al. | ............ | 320/115 |
| 7,420,293 B2 * | 9/2008 | Donnelly et al. | ............... | 307/34 |
| 7,746,036 B2 * | 6/2010 | Wolf et al. | ..................... | 320/162 |
| 7,781,908 B2 * | 8/2010 | DuBose et al. | ................. | 307/31 |
| 7,847,520 B2 * | 12/2010 | Veselic et al. | .................. | 320/137 |
| 2003/0011486 A1 * | 1/2003 | Ying | ........................ | 340/825.69 |
| 2003/0020333 A1 * | 1/2003 | Ying | ............................. | 307/38 |
| 2004/0164708 A1 * | 8/2004 | Veselic et al. | ................. | 320/132 |
| 2006/0075266 A1 * | 4/2006 | Popescu-Stanesti et al. | . | 713/300 |
| 2009/0230769 A1 * | 9/2009 | Aerts | ................................ | 307/32 |
| 2010/0079000 A1 * | 4/2010 | Yamamota et al. | ............ | 307/39 |

FOREIGN PATENT DOCUMENTS

| | | |
|---|---|---|
| JP | 09-037483 | 2/1997 |
| JP | 2000-172387 | 6/2000 |
| JP | 2001-186680 | 7/2001 |

* cited by examiner

*Primary Examiner* — Edward Tso
*Assistant Examiner* — Manuel Hernandez
(74) *Attorney, Agent, or Firm* — Antony P. Ng; Yudell Isidore Ng Russell PLLC

(57) ABSTRACT

A method for controlling a charging system having multiple loads is disclosed. Power is supplied from an AC/DC adapter to a first charger, a second charger, and system loads. The first charger is operated at a setting value having smaller power consumption than a setting value necessary for a first battery pack when output power of a power source reaches a first threshold value during a time when the first battery pack is required to be charged in a standard charging mode. The first charger is operated at a setting value according to a specific charging mode even when the output power of the power source reaches the first threshold value during a time when the first battery pack is required to be charged in the specific charging mode. A second charger is operated at a setting value having smaller power consumption than a setting value necessary for a second battery pack when the output power of the power source reaches a second threshold value larger than the first threshold value.

10 Claims, 5 Drawing Sheets

CHARGING SYSTEM FOR PRIORITIZING LOAD CONSUMPTION IN A NOTEBOOK COMPUTER

PRIORITY CLAIM

The present application claims benefit of priority under 35 U.S.C. §§120, 365 to the previously filed Japanese Patent Application No. JP2008-165380 entitled, "Charging Control System and Control Method" with a priority date of Jun. 25, 2008, which is incorporated by reference herein.

BACKGROUND OF THE INVENTION

1. Technical Field

The present invention relates to charging systems in general, and in particular to a method for controlling a charging system having multiple loads.

2. Description of Related Art

A notebook-type portable computer (notebook PC) has a relatively simple system configuration when being used in a mobile environment in order to achieve a light weight or prolong a battery-powered operating time. On the other hand, when being used in an office environment, the notebook PC can be connected to a function extending apparatus known as a docking station (or a port replicator) so that a user can utilize the features and capabilities corresponding to a desktop computer. The notebook PC is generally equipped with a charger, and in some cases, a special charger is also mounted on the function extending apparatus. Therefore, the user is able to carry and use a battery charged by the function extending apparatus with the notebook PC as an auxiliary battery.

When the notebook PC is being used while connected to a function extending apparatus, an AC/DC adapter is not connected directly to the notebook PC but the AC/DC adapter is preliminarily connected to the function extending apparatus supplies power to a system load of the notebook PC, a charger of the notebook PC, a system load of the function extending apparatus, and a charger of the function extending apparatus. Among all system loads, a central processing unit (CPU) exhibits the largest maximum power consumption. The AC/DC adapter has rated power suitable for the maximum power consumption of all system loads including the CPU. The variation in the power consumption of the system loads is severe, and charging the battery by means of the charger is not always an urgent task. Therefore, when the rated power of the AC/DC adapter is set to be larger than the sum of the total maximum power consumption of the system load and the maximum power consumption of the charger, the utilization rate of the AC/DC adapter may decrease, and thus, the battery is overcharged.

Therefore, the charging of the battery by means of the charger is generally carried out by using surplus power, which is the difference between the rated power of the AC/DC adapter and the power consumption of the system load. When the notebook PC is being used while connected to the function extending apparatus, power is supplied from the AC/DC adapter connected to the function extending apparatus, to the system load of the notebook PC, the system load of the function extending apparatus, and the charger of the notebook PC. However, depending on the overall power consumption or the output power of the AC/DC adapter, it may be necessary to limit the power consumption of any of the system loads.

In a computer system, generally, without limiting the power consumption of the system load, when the power consumption of the system load increases, the power consumption of both or either one of the charger of the notebook PC and the charger of the function extending apparatus is limited. One method is by measuring power consumption of a charger mounted on a notebook PC and power consumption of a charger mounted on a function extending apparatus and then controlling the power consumption of both or either one of the chargers based on the measurement result. Specifically, a configuration may be considered in which when output power of an AC/DC adapter exceeds a predetermined value, the power consumption of the charger of the notebook PC is compared with the power consumption of the charger of the function extending apparatus so that the larger power consumption is limited.

However, with the above-mentioned method, in order to limit the power consumption of the charger of the notebook PC or the charger of the function extending apparatus, it is necessary to acquire information regarding the power consumption of both chargers. The AC/DC adapter needs to supply power to the function extending apparatus connected to the notebook PC or the function extending apparatus not connected to the notebook PC. Therefore, when the notebook PC is not connected to the function extending apparatus, it is impossible to acquire information of the charger of the notebook PC, and thus, it is difficult to employ the above-mentioned method. However, when the notebook PC is being used without the function extending apparatus, as long as the battery mounted on the notebook PC is more sufficiently charged than the battery mounted on the function extending apparatus, it would be very convenient because a user is able to use the notebook PC in a mobile environment without the need to replace the battery. Therefore, it would be helpful to reduce the power consumption of the charger mounted on the function extending apparatus first or stop the charger when controlling the power consumption of the charger.

Various safety measures are taken to ensure safe charging of a secondary battery. For example, when a battery voltage decreases, a method is employed in which pre-charging is first performed with a very small current and then transitions to a normal charging mode. In this case, when the battery voltage is not recovered by the pre-charging within predetermined consecutive intervals of time, a safety device is operated so that the charging is temporarily stopped. Therefore, there is a possibility that the charger mounted on the function extending apparatus is stopped, and thus, the pre-charging is not completed within a predetermined period of time. In such a case, a user may need to perform a reset operation, and thus, the charging operation becomes complicated.

SUMMARY OF THE INVENTION

In accordance with a preferred embodiment of the present invention, power is supplied from an AC/DC adapter to a first charger, a second charger, and system loads. The first charger is operated at a setting value having smaller power consumption than a setting value necessary for a first battery pack when output power of a power source reaches a first threshold value during a time when the first battery pack is required to be charged in a standard charging mode. The first charger is operated at a setting value according to a specific charging mode even when the output power of the power source reaches the first threshold value during a time when the first battery pack is required to be charged in the specific charging mode. A second charger is operated at a setting value having smaller power consumption than a setting value necessary for a second battery pack when the output power of the power source reaches a second threshold value larger than the first threshold value.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
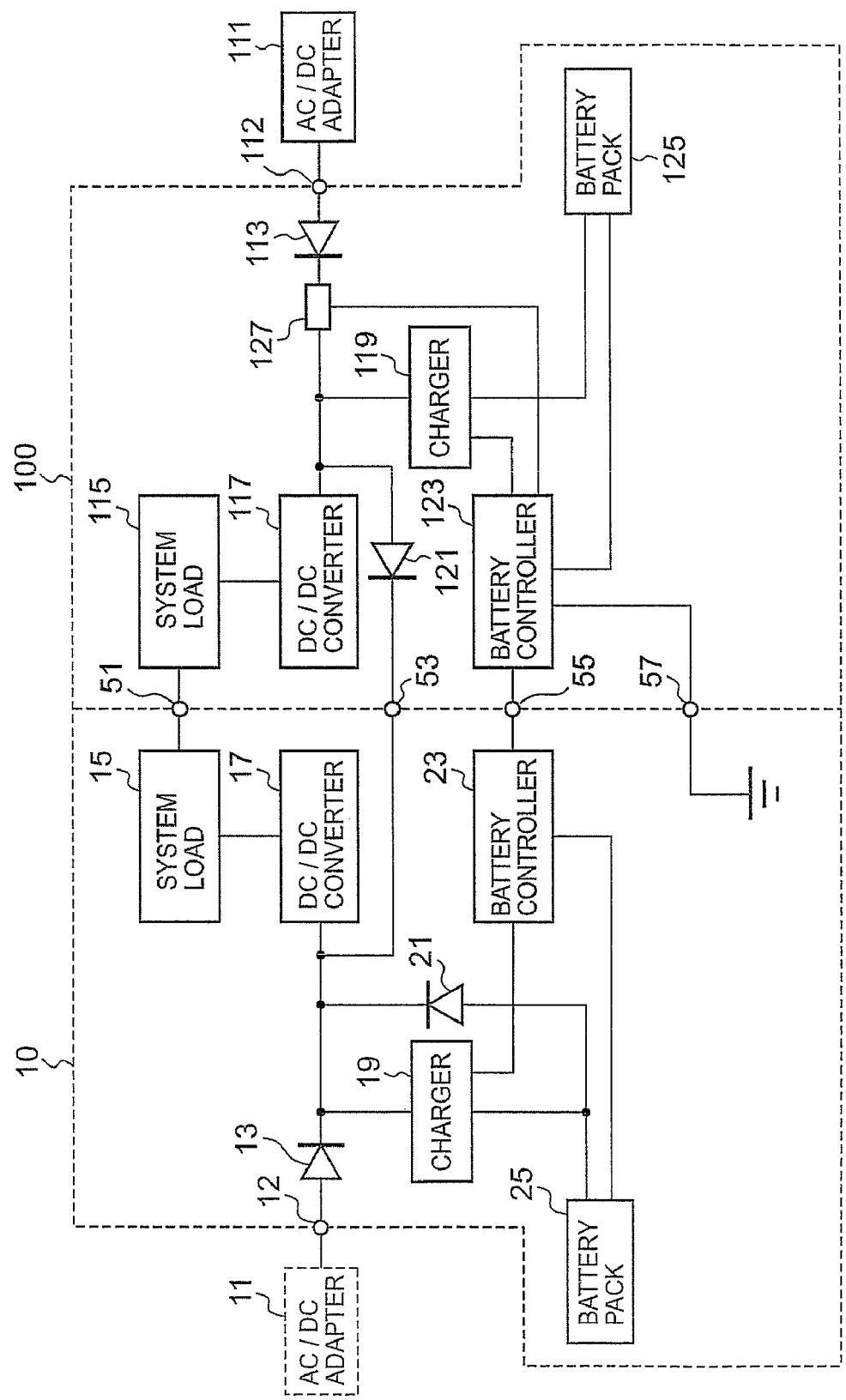
FIG. 1 is a block diagram of a charging system, in accordance with a preferred embodiment of the present invention.

Referring now to the drawings and in particular to FIG. 1, there is depicted a block diagram of a charging system having a notebook PC 10 connected to a docking station 100. The notebook PC 10 can be used in a stand-alone state or in a state of being connected to the docking station 100. The notebook PC 10 is equipped with a system load 15 of various kinds, e.g., a processor, a main memory, a system bus, and a hard disk drive. When the notebook PC 10 is used in an office environment without being connected to the docking station 100, an AC/DC adapter 11 is able to supply power to a charger 19 by being connected to a power jack 12 and to the system load 15 while charging a battery pack 25.

A DC/DC converter 17 receives power from the AC/DC adapter 11 via a diode 13. The DC/DC converter 17 receives power from the battery pack 25 via a diode 21 when the AC/DC adapter 11 is not connected to the power jack 12. The DC/DC converter 17 converts a DC voltage received from the AC/DC adapter 11 or the battery pack 25 to multiple stable DC voltages to be supplied to the system load 15.

A charger 19 is operated according to a constant-current/constant-voltage (CCCV) control method. The charger 19 converts the DC voltage supplied by the AC/DC adapter 11 to a predetermined voltage appropriate for charging by chopper control such as a PWM method or a PFM method. In the charger 19, a voltage setting value $V_{chg}$ for charging in a constant voltage mode, a current setting value $I_{chg}$ for charging in a constant current mode, and a current setting value $I_t$ for charging in a pre-charging mode are set by a battery controller 23 in response to a request from a battery pack 25. Here, the constant current mode and the constant voltage mode are referred to as standard charging modes.

The charger 19 performs chopper control so that an output current $I_c$ or an output voltage $V_c$ measured per se becomes identical with the current setting value $I_{chg}$, the voltage setting value $V_{chg}$ or the current setting value $I_t$. The battery pack 25 is an intelligent battery in compliant with the smart battery system (SBS) standards. The battery pack 25 is removably attached to a battery bay of the notebook PC 10. In the battery pack 25, a secondary battery, a controller, a current detection circuit, a voltage detection circuit, a protection device, and the like are accommodated.

A lithium ion battery includes multiple series-connected battery cells and generates a voltage that can be supplied to the DC/DC converter 17. The controller of the battery pack 25 measures a voltage and a current of each of the battery cells and calculates remaining capacity thereof to be stored as data. It should be noted that the present invention can also be applied to a system for charging a battery that is not compliant with the SBS standards. The battery pack 25 holds the respective setting values for charging in a memory thereof and is able to deliver the setting values to the battery controller 23.

When a lithium ion battery is over-discharged, ions are eluted from electrodes thereof and become unstable, which may be dangerous to recharge the battery in such a state. Although a protection circuit for preventing over-discharging is installed in the battery pack 25, when the battery cell voltage is decreased to about 3 V in response to discharging, for safety reasons, the battery pack 25 is not charged immediately in the constant current mode but is charged consecutively within a predetermined period of time with a very small current corresponding to about 10% of the charging current in the constant current mode. Once the battery cell voltage increases up to a predetermined value, the charging transitions to the constant current mode. Such charging with a very small current is called pre-charging or trickle charging.

An allowable period, which is a period of time between the start and the end of a pre-charging, is set to the battery pack 25. Moreover, a built-in timer counts the duration of the pre-charging so that when the pre-charging is not completed within consecutive allowable periods, a protection circuit is activated to stop the charging of the battery pack 25. In order to recharge the battery pack 25 for which the pre-charging is stopped, it is necessary to perform a reset operation by removing the battery pack 25 from the docking station 100 or disconnecting the AC/DC adapter 111. When the battery cell voltage is lower than a predetermined value, the battery pack 25 determines that the pre-charging is required and delivers a current setting value $I_t$ for the pre-charging to the battery controller 23.

The battery controller 23 includes a processor, a ROM, a RAM, an EEPROM, and the like and is connected to devices included in the system load 15 via a bus. The battery controller 23 is connected to the battery pack 25 via a SM bus so that the voltage setting value $V_{chg}$, the current setting value $I_{chg}$, and the current setting value $I_t$ set to the charger 19 or other data such as remaining capacity can be received from the processor of the battery controller 23. The battery controller 23 sets the setting values received from the battery pack 25 to the charger 19. The battery controller 23 is able to recognize whether or not the battery pack 25 is attached to the battery bay of the notebook PC 10 by a well-known method. Moreover, the charger 19 and the battery controller 23 are part of the system load 15.

When being used in an office environment, the notebook PC 10 is able to utilize extended features and capabilities by connecting to the docking station 100 that is a function extending apparatus. Although the function extending apparatus is sometimes called a port replicator when it does not possess a device serving as a bus master, the function extending apparatus according to the present embodiment is provided with at least a charging system and a function of controlling the charging system on the basis of output power P of the AC/DC adapter 111. The docking station 100 is equipped with a system load 115, e.g., an optical drive, a hard disk drive, a LAN card, a USB interface, and a video card.

The notebook PC 10 is able to recognize and access the system load 115. The docking station 100 is always connected to an externally attached display, a LAN cable, an externally attached keyboard, and the like so that it is possible to use the notebook PC 10 when it is connected to the docking station 100. A battery pack 125 is compatible with the battery pack 25 and is removably attached to a battery bay of the docking station 100.

An AC/DC adapter 111 is able to supply power to the system load 115 and a charger 119 via a diode 113 by being connected to a power jack 112 even when the notebook PC 10 is not connected to the docking station 100. When the notebook PC 10 is connected to the docking station 100, the power jack 12 of the notebook PC 10 is configured to be concealed by a casing of the docking station 100, and thus, it is unable to use the AC/DC adapter 11. Instead, the AC/DC adapter 111 also supplies power to the DC/DC converter 17 and the charger 19 of the notebook PC 10.

The charger 119 has the same configuration as the charger 19. A battery controller 123 has the same features for controlling the charger 119 and the battery pack 125 as those in the battery controller 23 for controlling the charger 19 and the battery pack 25. Specifically, the battery controller 123 sets the respective charging setting values received from the battery pack 125 to the charger 119. The battery controller 123 is able to change the setting value of the charging current $I_{chg}$ of the charger 119 for each of predetermined step values. When the output power P of the AC/DC adapter 111 increases, the battery controller 123 delivers the current setting value $I_{chg}$ of the charger 19 to the battery controller 23 and instructs the battery controller 23 to change the setting value for each of the predetermined step values. At this time, the battery controller 23 changes the current setting value of the charger 19 in accordance with the instruction of the battery controller 123.

In an EEPROM within the battery controller 123, a program allowing the battery controller 123 to change the current setting value $I_{chg}$ of the charger 119 is stored in order to execute the power consumption control method according to the present embodiment. The battery controller 123 holds therein the rated power $P_a$ (W) of the AC/DC adapter 111, a first threshold value $Th_1$ (W), and a second threshold value $Th_2$ (W). Rated power $P_a$, first threshold value $Th_1$ and second threshold value $Th_2$ satisfy the following relationship: $P_a > Th_2 > Th_1$.

A power detector 127 includes a sense resistor for current detection and supplies two analog voltage values corresponding to an output voltage and an output current of the AC/DC adapter 111 to the battery controller 123. Upon receiving the analog voltage values from the power detector 127, the battery controller 123 calculates the output power of the AC/DC adapter 111. Moreover, the charger 119 and the battery controller 123 are parts of the system load 115.

The DC/DC converter 117 is able to receive power from the AC/DC adapter 111 via the diode 113 when the AC/DC adapter 111 is connected to the power jack 112 but is unable to receive power when the AC/DC adapter 111 is not connected to the power jack 112. The notebook PC 10 and the docking station 100 are connected via connectors 51, 53, 55 and 57. The connectors 51 and 55 are connected, for example, to an LPC bus and a PCI-Express bus of the notebook PC 10 and the docking station 100. The buses of the notebook PC 10 are extended to an inside of the docking station 100 via the connector 51 and 55, whereby the notebook PC 10 is able to recognize and utilize the system load 115 of the docking station 100.

The connector 53 supplies power from the AC/DC adapter 111 to the system load 15 and the charger 19 of the notebook PC 10 via a diode 121. The connector 57 is connected to the ground potential of the notebook PC 10 and the battery controller 123 and transfers a signal when the battery controller 123 detects that the notebook PC 10 is connected to the docking station 100.

When the notebook PC 10 is connected to the docking station 100 and the system loads 15 and 115 operate, power is supplied from the AC/DC adapter 111 to the system loads 15 and 115 and the chargers 19 and 119. Therefore, if the rated power $P_a$ of the AC/DC adapter 111 is higher than the sum of the maximum power consumption of all these loads, there is no need to impose any restriction on charging of the battery packs 25 and 125. However, since the power consumption of the system loads 15 and 115 and the chargers 19 and 119 varies greatly, when the rating capacity of the AC/DC adapter 111 is set to be higher than the sum of the maximum power consumption of the loads, the utilization rate of the AC/DC adapter 111 may decrease, which is not economically desirable.

In the present embodiment, the rated power $P_a$ of the AC/DC adapter 111 is set to be equal to or higher than the maximum power consumption of the system loads 15 and 115, but it is also set to be incapable of operating both the charger 19 and the charger 119 when the system loads 15 and 115 are operating with the maximum power consumption. Therefore, the charging of the battery pack 25 by means of the charger 19 and the charging of the battery pack 125 by means of the charger 119 are basically carried out by surplus power of the AC/DC adapter 111 relative to the power consumption of the system loads 15 and 115.

Meanwhile, when a user uses the notebook PC 10 in a state of being connected to the docking station 100 after using the notebook PC 10 in a mobile environment, the user puts the highest priority to working with the notebook PC 10 and wishes the charging of the battery pack 25 to be completed as quick as possible in order for later mobile usage. That is, when the notebook PC 10 is being used while connected to the docking station 100, the power from the AC/DC adapter 111 is sequentially supplied to the system loads 15 and 115, the charger 19 and the charger 119 in the order of a priority thereof. In the present embodiment, paying attention to this priority when power is being supplied from one source (i.e., the AC/DC adapter 111) to multiple destinations (i.e., the chargers 19, 119 and the system loads 15, 115), the power consumption of the charger 19 and the charger 119 is controlled while maintaining the rated power of the AC/DC adapter 111.

A description of the operation of the charging control system illustrated in FIG. 1 will be provided below. When the system load 15 and the system load 115 are collectively treated as one system load 15 and 115 in the computer system illustrated in FIG. 1, then three loads, namely, the system load 15 and 115, the charger 19 and the charger 119 are present as a load to the AC/DC adapter 111. In the present embodiment, the power consumed by the system load 15 and 115, the charger 19 and the charger 119 is controlled by the battery controller 123 on the basis of only the output power P of the AC/DC adapter 111. The battery controller 123 controls the power consumption by executing the program stored in the EEPROM.

Figure 5:
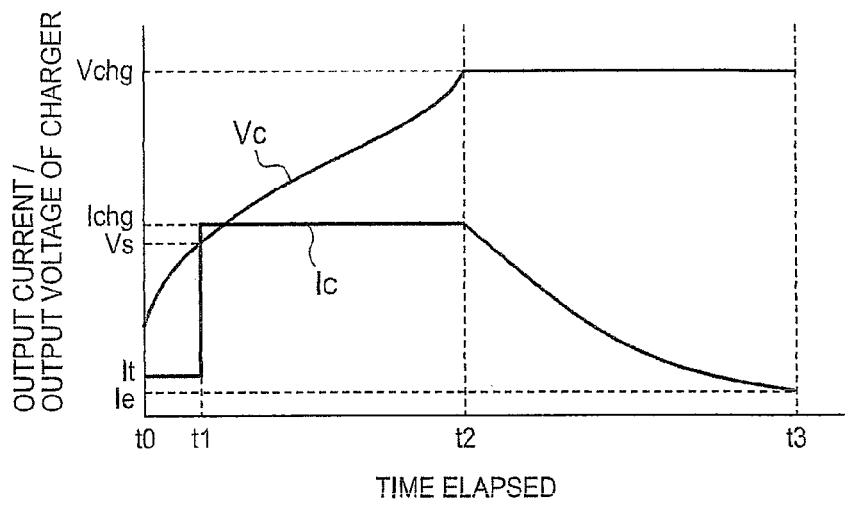
FIG. 5 is a graph illustrating changes in an output current and an output voltage of a charging system when charging a lithium ion battery.

FIG. 5 is a graph illustrating changes in an output current and an output voltage of the charger 119 when charging a lithium ion battery accommodated in the battery pack 125. In FIG. 5, the horizontal axis represents a time lapsed after charging start time, and the vertical axis represents an output current $I_c$ and an output voltage $V_c$ of the charger 119. The illustrated output voltage $V_c$ is a value that is converted into a battery cell voltage. A period between time t0 and time t1 is a period where the battery pack 125 is charged in the pre-charging mode, a period between time t1 and t2 is a period where the battery pack 125 is charged in the constant current mode, and a period between time t2 and time t3 is a period where the battery pack 125 is charged in the constant voltage mode. At time t0, the battery pack 125 measures the battery cell voltage and sets the current setting value $I_t$ to the charger 119 when it is determined that the pre-charging is required. When the output voltage $V_c$ of the charger 119 at time t1 has increased up to a pre-charging stop voltage $V_s$ within an allowable period, the battery pack 125 sets, to the charger 119, the current setting value $I_{chg}$ and the voltage setting value $V_{chg}$ necessary for charging in the constant current mode and the constant voltage mode, which are the standard charging mode.

At time t1, the charger 119 transitions to the constant current mode, so that the output current $I_c$ of the charger 119 becomes identical with the current setting value $I_{chg}$. When the output current $I_c$ starts decreasing to be lower than the current setting value $I_{chg}$ at time t2, the charger 119 transitions to the constant voltage mode, so that the output voltage $V_c$ becomes identical with the voltage setting value $V_{chg}$. During the period of the constant voltage mode, the output current $I_c$ gradually decreases with the progress of the charging, and the battery cell voltage gradually increases. At time t3, upon determining that the output current $I_c$ has reached a charging stop current $I_e$ or that the battery cell voltage has reached a predetermined value, the battery pack 125 notifies the battery controller 123 of a determination result, whereby the charger 119 is stopped.

Figure 2:
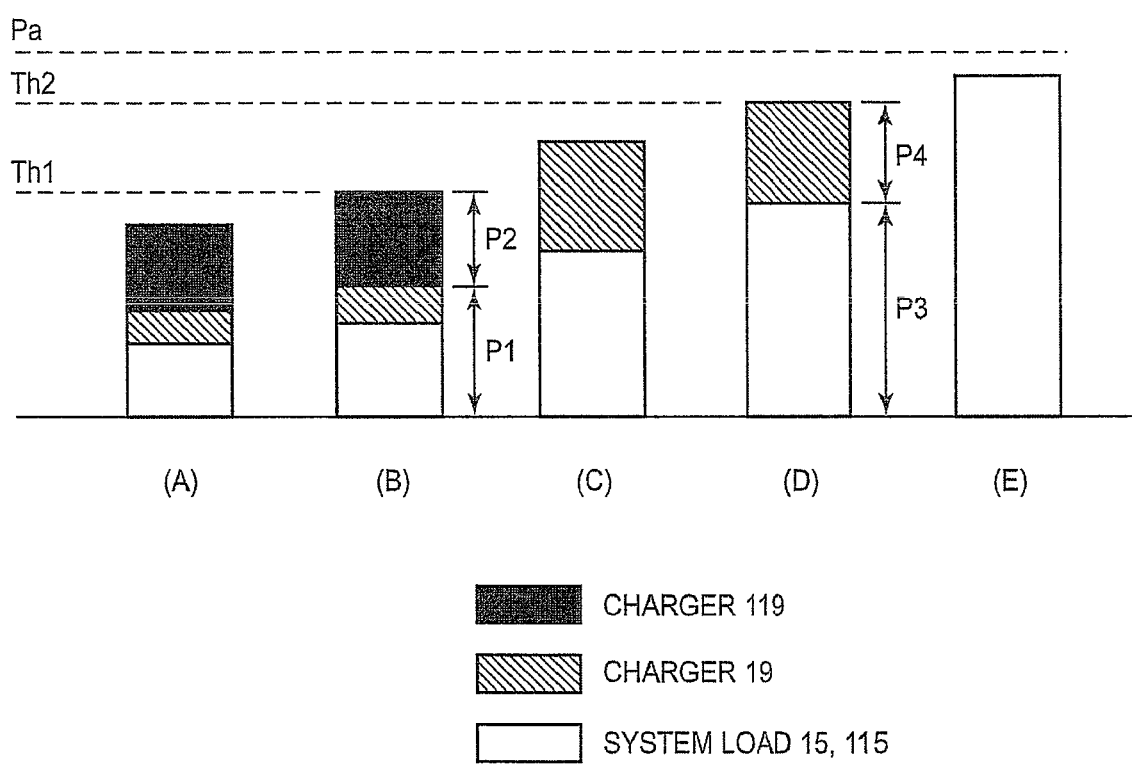
FIG. 2 is a diagram for explaining a method of controlling output power of an AC/DC adapter and power consumption of a charging system.
Figure 3:
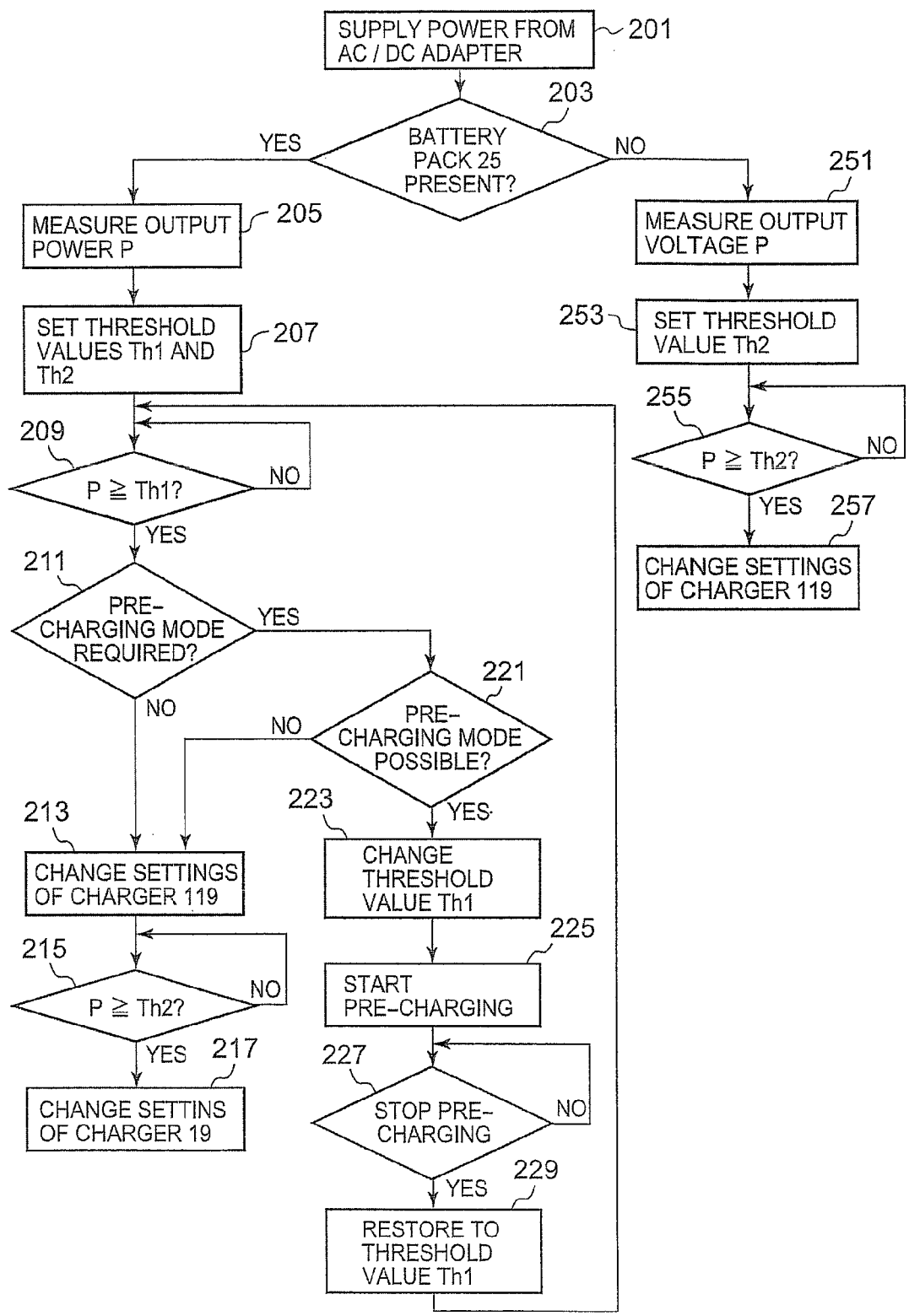
FIG. 3 is a high-level logic flow diagram of a method for controlling the power consumption of a load as explained in FIG. 2.

FIG. 2 is a diagram for explaining the method of controlling the output power of the AC/DC adapter 111 and the power consumption of the chargers 19 and 119, and FIG. 3 is a flow chart of the method in FIG. 2. As an example, it is assumed that the rated power $P_a$ of the AC/DC adapter 111 is 65 W and the maximum power consumption of each of the charger 19 and the charger 119 is 54 W. Moreover, it is assumed that the maximum power consumption of the system load 15 and 115 is 65 W. Furthermore, it is assumed that the maximum power consumption of the system load 15 and 115 when considering the margin thereof does not exceed the rated power $P_a$ of the AC/DC adapter 111. Here, the sum of the maximum power consumption of the loads is 54+54+65=173 W and exceeds the rated power $P_a$. Moreover, in FIG. 2, the first threshold value $Th_1$ is set to 33 W, and the second threshold value $Th_2$ is set to 54 W so that the second threshold value $Th_2$ has a higher priority than the first threshold value $Th_1$.

At block 201 of FIG. 3, it is assumed that the notebook PC 10 equipped with the battery pack 25 and the AC/DC adapter 111 are connected to the docking station 100, and that the docking station 100 is equipped with the battery pack 125. Moreover, in the chargers 19 and 119, the setting value necessary for the battery packs 25 and 125 at that moment are set by the battery controllers 23 and 123. Therefore, the chargers 19 and 119 start charging in a pre-charging mode or a standard charging mode upon receiving power from the AC/DC adapter 111.

When charging is performed by the standard charging mode, the power consumption of the chargers 19 and 119 increases with the battery cell voltage when they are operating in a constant current mode, becomes the maximum when they switch from the constant current mode to a constant voltage mode, and decreases after they transition to the constant voltage mode. The power consumption of the chargers 19 and 119 when they are charged in the pre-charging mode corresponds to 10% of the power consumption when they are charged in the constant current mode. At block 201, the power consumption of the chargers 19 and 119 is determined by the remaining capacity of the battery packs 25 and 125 at that moment. At block 203, the battery controller 123 makes a determination as to whether or not the notebook PC 10 is connected to the docking station 100 on the basis of whether or not a line connected to the connector 57 is at the ground potential.

Since the battery pack 25 is generally mounted on the notebook PC 10, when the battery controller 123 has determined that the notebook PC 10 is connected to the docking station 100, it is reasonable to determine that a charging system which includes the battery pack 25 and the charger 19 is present as a load to the AC/DC adapter 111. The charging system does not consume power when the battery pack is not mounted. Because the present invention is applicable when the notebook PC 10 is equipped with multiple charging systems, each charging system including multiple auxiliary battery packs, when it is determined that the notebook PC 10 is connected to the docking station 100, the battery controller 123 may make inquiries to the battery controller 23 to determine whether or not the battery pack 25 is actually mounted on the notebook PC 10.

When the battery controller 123 has determined that the battery pack 25 is mounted on the notebook PC 10, the process proceeds to block 205. When the battery pack 123 has determined that the notebook PC 10 is not connected to the docking station 100 or when it is determined that the notebook PC 10 is connected but the battery pack 25 is not mounted on the notebook PC 10, the process proceeds to block 251. At block 205, the AC/DC adapter 111 supplies power to the system loads 15 and 115 and the chargers 19 and 119, whereby a user is provided with a usable environment for the notebook PC 10 and the battery packs 25 and 125 are charged. At this time, the battery controller 123 periodically receives data from the power detector 127 and measures the output power P of the AC/DC adapter 111.

At block 207, the battery controller 123 applies the first threshold value $Th_1$ and the second threshold value $Th_2$ embedded in the program to the charger 119 and the charger 19, respectively. At block 209, the battery controller 123 makes a determination as to whether or not the output power P reaches the first threshold value $Th_1$. When the output power P has not reached the first threshold value $Th_1$, as illustrated in (A) of FIG. 2, values necessary for the battery packs 25 and 125 are set to the charger 19 and the charger 119 so that necessary power is supplied from the AC/DC adapter 111 to the charger 19 and the charger 119. Although the present embodiment excludes the power consumption of the system loads 15 and 115 from a control subject, the present invention includes the case when the power consumption of the system loads 15 and 115 is controlled on the basis of a threshold value.

The power consumption of the system loads 15 and 115 varies depending on the tasks that the user works with the notebook PC 10. The power consumption of the chargers 19 and 119 increases gradually as long as they are charged in the constant current mode. At block 209, as illustrated in (B) of FIG. 2, when the power consumption of any one or several of the three loads increases, and thus, the battery controller 123 determines that the output power P reaches the first threshold value $Th_1$, the process proceeds to block 211. At block 211, the battery controller 123 makes a determination as to whether or not the battery pack 125 is requesting to the charger 119 to be charged in the pre-charging mode. The battery controller 123 recognizes that the battery pack is required to be charged in the pre-charging mode from the fact that the battery pack 125 is required to be charged at the current setting value It.

If the battery pack 25 is not required to be charged in the pre-charging mode, the process proceeds to block 213. At block 213, the battery controller 123 decreases the current setting value $I_{chg}$ of the charger 119 on the basis of a setting value embedded in a program held per se without using the setting value necessary for the battery pack 125 to reduce the power consumption of the charger 119. Moreover, when the charger 119 is charging in the constant voltage mode, the battery controller 123 is able to decrease the voltage setting value $V_{chg}$ or stop the charging. The battery controller 123 changes the setting value of the charger 119 so that the output power P does not exceed the first threshold value $Th_1$.

The battery controller 123 calculates the output power of the AC/DC adapter 111 at predetermined intervals of time and decreases the current setting value $I_{chg}$ of the charger 119 to reduce the power consumption when the output power P exceeds the first threshold value $Th_1$. When the power consumption of both or either one of the system load 15 and 115 and the charger 19, as illustrated in (C) of FIG. 2, it is impossible to prevent the output power P from exceeding the first threshold value $Th_1$ even when the operation of the charger 119 has stopped. At block 215, the battery controller 123 makes a determination as to whether or not the output power P has reached the second threshold value $Th_2$. At block 215, as illustrated in (D) of FIG. 2, when the power consumption of both or either one of the system loads 15 and 115 and the charger 19, and thus, the battery controller 123 determines that the output power P has reached the second threshold value $Th_2$, the process proceeds to block 217.

At block 217, when the battery controller 123 determines that the output power P exceeds the second threshold value $Th_2$, the battery controller 123 instructs the battery controller 23 to decrease the current setting value $I_{chg}$ of the charger 19. The battery controller 23 changes the current setting value $I_{chg}$ of the charger 19 to reduce the power consumption in accordance with the instruction of the battery controller 123. At this time, the battery controller 123 may indicate the current setting value $I_{chg}$ to the battery controller 23, or the current setting value $I_{chg}$ of the charger 19 may be embedded into the program of the battery controller 23. Moreover, when the charger 19 is charging in the constant voltage mode, having received the instruction to reduce the power consumption from the battery controller 123, the battery controller 23 is able to decrease the voltage setting value $V_{chg}$ or stop the charging. Because the maximum power consumption of the system loads 15 and 115 is set within the rated power $P_a$ of the AC/DC adapter 111, as illustrated in (E) of FIG. 2, power is continuously supplied to the system loads 15 and 115.

When it is determined at block 211 that the battery pack 125 is required to be charged in the pre-charging mode, the process proceeds to block 221. At block 221, the battery controller 123 makes a determination as to whether or not it is acceptable for the charger 119 to transition to the pre-charging mode on the basis of the output power P and the power consumption of the charger 119 in the pre-charging mode. The power consumption of the charger 119 in the pre-charging mode is substantially constant, e.g., about 3 to 5 W, and the data thereof is held in the battery controller 123. Since the power consumption in the pre-charging mode is small, as long as there is a margin capable of absorbing the power consumption in a difference between the rated power $P_a$ and the maximum power consumption of the system loads 15 and 115, the process may proceed to block 223 while skipping the determination at block 221.

If the battery controller 123 determines at block 221 that there is a possibility that the output power P exceeds the rated power $P_a$ if the charger 119 is operated in the pre-charging mode, on the basis of the output power P of the AC/DC adapter 111 at that time point, then, the process proceeds to block 213. If the battery controller 123 determines at block 221 that there is no possibility that the output power P exceeds the rated power $P_a$ even when the charger 119 is operated in the pre-charging mode, then, the process proceeds to block 223. At block 223, the battery controller 123 changes the first threshold value $Th_1$ set to the charger 119 at block 207 to a third threshold value $Th_3$, which is sufficiently larger than the second threshold value $Th_2$, or to infinity.

Because the threshold value $Th_1$ applied to the charger 119 has been changed to a larger value, the condition at block 209 is not satisfied, and thus, the battery controller 123 does not perform the operation of changing the settings of the charger 119 so as to reduce the power consumption on the basis of the output power P and the first threshold value $Th_1$ which has been set. Then, the battery controller 123 sets the current setting value $I_t$ of the pre-charging mode necessary for the battery pack 125 to the charger 119. At block 225, the charger 119 charges the battery pack 125 in the pre-charging mode. If the charger 119 has been operated in the pre-charging mode from the states of block 201, the battery controller 123 allows the charger 119 to continue the charging in the pre-charging mode. Moreover, instead of changing the first threshold value at block 223, the battery controller 123 may hold the current setting value $I_t$ and set the current setting value $I_t$ to the charger 119 regardless of the fact that the output power P has exceeded the first threshold value.

When the battery pack 125 is required to be charged in the pre-charging mode and when the battery controller 123 determines at block 221 that the charging in the pre-charging mode is possible, the current setting value $I_{chg}$ of the charger 119 may not be changed based on the output power P at block 213. Therefore, the charger 119 is able to consume power necessary for the pre-charging irrespective of the magnitude of the power consumption of the system loads 15 and 115 and the charger 19 to charge the battery pack 125 in the pre-charging mode. At block 227, the battery pack 125 counts the consecutive time lapses in the pre-charging mode to determine whether or not the battery cell voltage has increased up to the pre-charging stop voltage $V_s$ within a predetermined period of time, and if the determination result is positive, the process proceeds to block 229.

At block 229, when the charging in the pre-charging mode stops, the battery pack 125 delivers the voltage setting value $V_{chg}$ and the current setting value $I_{chg}$ of the standard charging mode to the battery controller 123 in order to perform the charging in the standard charging mode. Upon receiving the voltage charging voltage $V_{chg}$ and the current setting value $I_{chg}$ from the battery pack 125, the battery controller 123 recognizes that the charging in the pre-charging mode has been completed and restores the first threshold value $Th_1$ of the charger 119, which was changed to the third threshold value $Th_3$ or the infinity at block 223, to the value set at block 207, and then, the process proceeds to block 209. Thereafter, the charging of the battery pack 125 is performed under the control of the battery controller 123 based on the output power P and the first threshold value $Th_1$ which was initially set. When the charging in the pre-charging mode is not completed within the predetermined period of time at block 227, the protection circuit of the battery pack 125 is activated so that the charging of the battery pack 125 is stopped. In order to resume the charging, it is necessary to reset the protection circuit of the battery pack 125 by removing the battery pack 125 or stopping the supply of power from the AC/DC adapter 111.

Figure 4A:
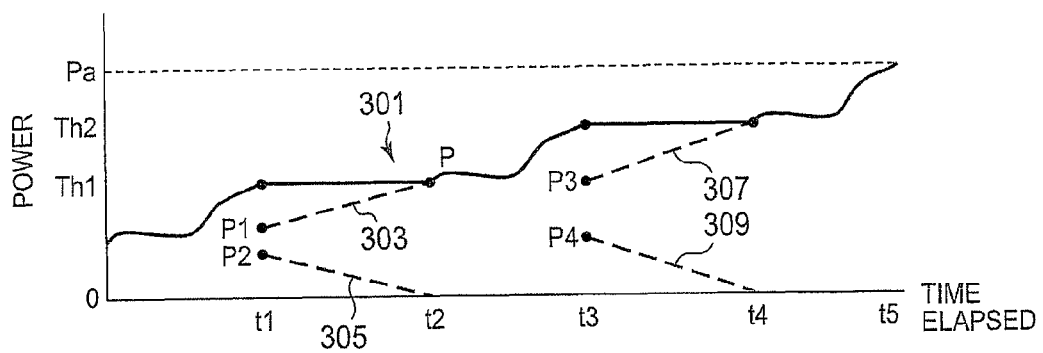
FIGS. 4A to 4C are three example graphs illustrating the variations of the output power of the AC/DC adapter with the lapse of time in response to control of the power consumption of the charging system from FIG. 1.
Figure 4B:
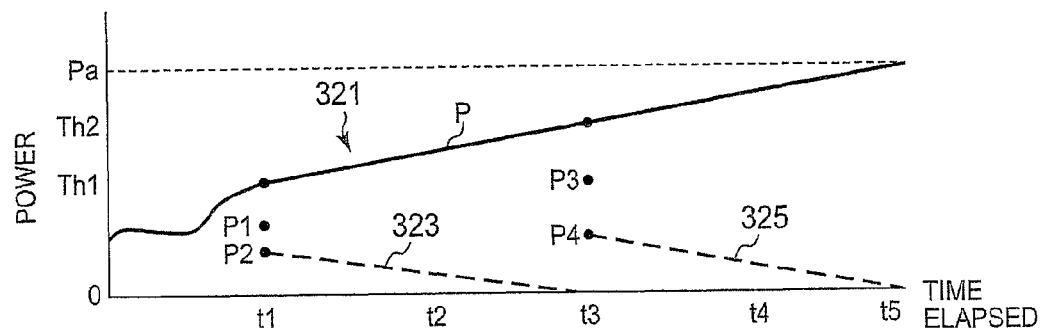
Figure 4C:
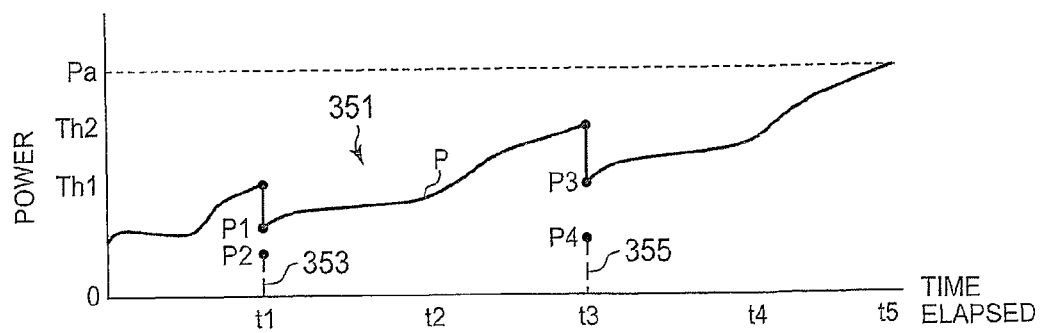

A detailed description of the controlling of the power consumption of the chargers 119 and 19 at blocks 213 and 217 will be provided with reference to FIGS. 4A to 4C. Because these figures aim to describe the method of controlling the power consumption of the chargers 19 and 119 based on the output power P in order to maintain the rated power $P_a$ of the AC/DC adapter 111, the states in the pre-charging mode are omitted. FIGS. 4A to 4C are three example graphs illustrating the variation of the output power of the AC/DC adapter 111 with the lapse of time in response to control of the power consumption of the chargers 119 and 19. In FIG. 4A, before time t1, the sum of the power consumption of the system loads 15 and 115, the charger 19, and the charger 119 is identical with the output power P as denoted by line 301. At time t1, the output power P reaches the first threshold value $Th_1$. At this time, let the sum of the power consumption of the system loads 15 and the 115 and the power consumption of the charger 19 be P1 and the power consumption of the charger 119 be P2, the relationship of P1+P2=P is satisfied.

After time t1, when the power consumption P1 gradually increases along line 303, the battery controller 123 gradually reduces the power consumption of the charger 119 along line 305. The battery controller 123 decreases the current setting value $I_{chg}$ of the charger 119 by a predetermined step number when the output power P exceeds the first threshold value $Th_1$ and increases the current setting value $I_{chg}$ of the charger 119 by a predetermined step number when the output power P is lower than the first threshold value $Th_1$. As a result, the output power P is maintained at the first threshold value $Th_1$ during a period between time t1 and time t2.

At time t2, the power consumption P2 reaches zero, and the output power P becomes identical with the power consumption P1. Moreover, during a time between time t2 and time t3, the power consumption P1 increases further, and the output power P reaches the second threshold value $Th_2$ at time t3. At this time, let the power consumption of the system loads 15 and 115 be P3 and the power consumption of the charger 19 be P4, the relationship of P3+P4=P is satisfied. After time t3, when the power consumption P3 gradually increases along line 307, the battery controller 123 gradually reduces the power consumption of the charger 19 along line 309.

The battery controller 123 decreases the current setting value $I_{chg}$ of the charger 19 by a predetermined step number when the output power P exceeds the second threshold value $Th_2$ and increases the current setting value $I_{chg}$ of the charger 19 by a predetermined step number when the output power P is lower than the second threshold value $Th_2$. As a result, the output power P is maintained at the second threshold value $Th_2$ during a period between time t3 and t4. At time t4, the power consumption of the charger 19 reaches zero, and the output power P becomes identical with the power consumption P3. After time t4, only the system load 15 and 115 constitutes the load of the AC/DC adapter 11. Therefore, even when the power consumption P3 reaches the rated power $P_a$ at time t5, the AC/DC adapter 111 is able to continuously supply the power because the power consumption P3 might not exceed the rated power $P_a$. Moreover, when the AC/DC adapter 111 has a margin, the power consumption of the charger 119 and the charger 19 may not be controlled to be zero at time t2 and t4, respectively, so that they continue charging with small power.

It can be said that the battery controller 123 controls the power consumption P2 of the charger 119 or the power consumption P4 of the charger 19 so that the output power P of the AC/DC adapter 111 gets closer to the first threshold value $Th_1$ or the second threshold value $Th_2$ when the output power P of the AC/DC adapter 111 exceeds the first threshold value $Th_1$ or the second threshold value $Th_2$. It is possible to provide control so that the power consumption P2 of the charger 119 becomes zero or the lowest during a time when the output power P reaches the second threshold value $Th_2$ and that the power consumption P4 of the charger 19 becomes zero or the lowest during a time when the output power P reaches the rated power $P_a$.

In FIG. 4B, although it is the same as FIG. 4A before time t1, the output power P gradually increases along line 321 during a time between time t1 and time t3 when the output power P reaches the second threshold value, and the battery controller 123 gradually reduces the power consumption P2 of the charger 119 along line 323 until time t3. After time t3, the output power P gradually increases along line 321 during a time between time 3 and time t5, and the battery controller 123 gradually reduces the power consumption P4 of the charger 19 along line 325 until time t5. In FIG. 4B, control is provided so that the power consumption of the charger 119 becomes zero during a time when the output power P reaches the second threshold value and that the power consumption of the charger 19 becomes zero during a time when the output power P reaches the rated power $P_a$.

Although the present embodiment controls the power consumption of the chargers 119 and 19 on the basis of only the output power P without measuring the power consumption P2 and P4, this control can be realized by embedding the relationship between the value of the power consumption P and the current setting values $I_{chg}$ of the chargers 119 and 19 into a program. Specifically, on the basis of power corresponding to a difference between the power consumption P and the second threshold value $Th_2$ and the current setting value $I_{chg}$ in a present operation mode of the charger 119, it is controlled so that the current setting value $I_{chg}$ of the charger 119 becomes zero when the power consumption P reaches the second threshold value. For example, assuming that the current setting value $I_{chg}$ of the charger 119 at time t1 is 10 and a difference between the first threshold value $Th_1$ and the second threshold value $Th_2$ is 20 W, when the output power P is increased to be 5 W higher than the first threshold value $Th_1$, the current setting value $I_{chg}$ of the charger 119 is set to 5 while the setting value is set to zero when the output power P is 20 W higher than the first threshold value. Similarly, on the basis of power corresponding to a difference between the power consumption P and the rated power $P_a$ and the current setting value $I_{chg}$ in a present operation mode of the charger 19, it is controlled so that the current setting value $I_{chg}$ of the charger 19 becomes zero when the power consumption P reaches the rated power $P_a$. Therefore, the shape of the lines 323 and 325 depends on the change of the output power P.

The methods illustrated in FIGS. 4A and 4B are similar in that the power consumption of the charger 119 becomes zero during a time when the output power P reaches the second threshold value and that the power consumption of the charger 19 becomes zero during a time when the output power P reaches the rated power $P_a$. Although the method of FIG. 4B is more likely to increase the margin of the threshold value than the method of FIG. 4A, it is possible to supply power to the chargers 119 and 19 for a longer period of time.

In FIG. 4C, although it is the same as FIGS. 4A and 4B before time t1, the battery controller 123 controls so that the power consumption P2 of the charger 119 becomes zero at time t1 along line 353. During a time between time t1 and time t3, the output power P becomes identical with the sum of the power consumption P1 of the system loads 15 and 115 and the charger 19 along line 351. When the output power P reaches the second threshold value at time t3, the battery controller 123 controls so that the power consumption P4 of the charger 19 becomes zero along line 355. After time t4, the output power P becomes identical with the power consumption P3 of the system loads 15 and 115. Although the method of FIG. 4C is able to decrease the margin of the threshold value compared with other methods, the period of time in which power is supplied to the chargers 19 and 119 becomes shorter.

At block 251, the AC/DC adapter 111 supplies power to the system loads 15 and 115 and the charger 119, whereby the user is provided with a usable environment for the notebook PC 10 and the battery pack 125 is charged. At block 253, the battery controller 123 recognizes that the notebook PC 10 is not connected to the docking station 100 or that the notebook PC 10 is connected but the battery pack 25 is not mounted on the notebook PC 10 and applies the second threshold value $Th_2$ to the charger 119. At block 255, the battery controller 123 makes a determination as to whether or not the output power P has reached the second threshold value $Th_2$. When the output power P has not reached the second threshold value $Th_2$, the battery controller 123 supplies necessary power to the system loads 15 and 115 and the charger 119.

Specifically, the charger 119 is operated with the current setting value $I_{chg}$ provided by the battery pack 125. When it is determined that the output power P has reached the second threshold value $Th_2$, the battery controller 123 reduces the power consumption of the charger 119 at block 257. The control method employs the method described with respect to FIGS. 4A to 4C. When the charger 19 having the higher priority is not present, the charger 119 is able to move up a priority thereof so that the power consumption thereof is controlled by the second threshold value $Th_2$ applied to the charger 19.

In accordance with the method shown in FIG. 3, when the rated power of the AC/DC adapter 111 is not sufficient for the charger 19, the charger 119, and the system loads 15 and 115, a higher priority is assigned to the charging of the battery pack 25 by means of the charger 19 than the charging of the battery pack 125 by means of the charger 119 while the power consumption of the system loads 15 and 115 having the highest priority is not limited. Therefore, it is possible to provide a user-friendly computer system. Moreover, since the charger 119 having the lower priority can be charged in the pre-charging mode irrespective of the output power P of the AC/DC adapter 111 and the first threshold value, it is not necessary to reset the battery pack 125.

Hereinabove, description has been made for an example in which in a specific charging mode where a pre-charging is performed in a state where the discharging voltage of the battery pack 125 is decreased to a predetermined level or lower, the charging in the pre-charging mode is preferentially performed than the control of the charger 119 based on the power consumption P and the first threshold value $Th_1$. However, the present invention is not limited to this. For example, from the viewpoint of safety, a safety measure that the charging is stopped when the discharging voltage has not reached up to the charging stop voltage within a predetermined period of time in the constant voltage mode may be taken to ensure the safety of the battery pack. The power consumption abruptly decreases with the progress of charging when it transitions to the constant voltage mode. In such a case, by employing the steps from block 221 to block 229 of FIG. 3, the charging in the constant voltage mode may be preferentially performed than the control of the charger 119 by the first threshold value $Th_1$ based on the power consumption P.

Moreover, in accordance with the method shown in FIG. 3, the battery controller 123 is able to control the power consumption of the chargers 19 and 119 so as to maintain the rated power of the AC/DC adapter 111 by merely measuring the output power P of the AC/DC adapter 111 without using information on the power consumption of the chargers 19 and 119. Therefore, it is possible to complete the charging of the battery pack 125 in a short period of time by effectively utilizing the surplus power of the AC/DC adapter 111 even when the notebook PC 10 is not connected to the docking station 100. Because it is ensured that the charger 119 having the lower priority is operated in the pre-charging mode when the battery pack 125 is required to be charged, it is possible to increase the duration of the pre-charging by lowering the priority of the power consumption. Therefore, it is possible to prevent occurrence of a situation where the charging of the battery pack 125 by the charger 119 is stopped.

Figure 6:
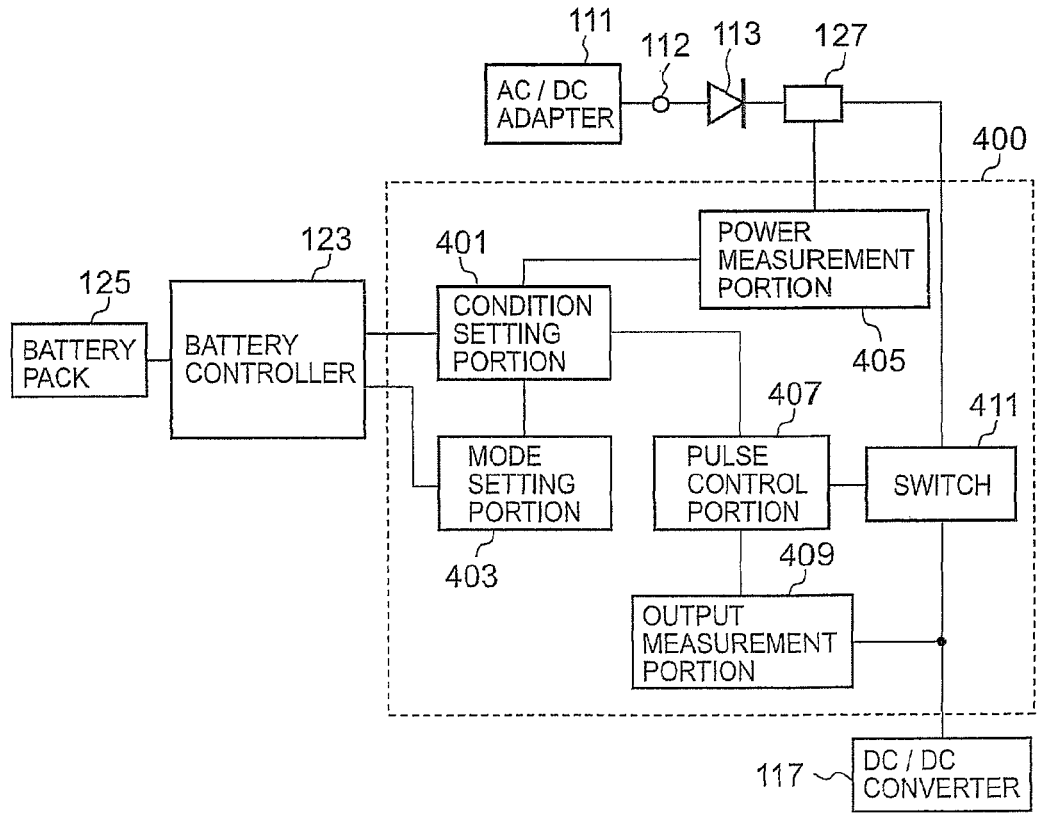
FIG. 6 is a block diagram of a charging system, in accordance with an alternative embodiment of the present invention.

Hereinabove, description has been made with respect the charging control system in which the battery controller 123 manages the threshold values $Th_1$ and $Th_2$ to control the power consumption of the chargers 19 and 119 on the basis of the output power P. A description of an example in which the charger in lieu of the battery controller 23 controls the power consumption will be provided herein below with reference to FIG. 6. FIG. 6 is a block diagram illustrating another configuration of the charger. The same components and elements as those of FIG. 1 will be denoted by the same reference numerals, and redundant description thereof will be omitted or simplified. A charger 400 may be employed in the charging control system of FIG. 1 in place of the charger 119. The charger 400 includes a condition setting portion 410, a mode setting portion 403, a power measurement portion 405, a pulse control portion 407, an output measurement portion 409, and a switch 411. The condition setting portion 401 sets setting values set by the battery controller 123 or setting values held per se to the pulse control portion 407.

The mode setting portion 403 sets information on the charging mode of the battery pack 125, received from the battery controller 123, to the condition setting portion 401. The pulse setting portion 407 generates control pulses using a PWM or PFM method so that an output voltage $V_c$ and an output current $I_c$ received from the output measurement portion 409 become identical with the voltage setting value $V_{chg}$ and the current setting value $I_{chg}$ set by the condition setting portion 401. The output measurement portion 409 measures the output voltage $V_c$ and the output current $I_c$ of the charger 400 and delivers the measured values to the pulse control portion 407. The switch 411 modulates the DC voltage supplied from the AC/DC adapter 111 by chopper control in accordance with the control pulses generated by the pulse control portion 407.

The condition setting portion 401 holds therein a first threshold value $Th_1$ and a second threshold value $Th_2$ and sets setting values to the pulse control portion 407 in accordance with the method shown in FIG. 3 on the basis of the output power P measured by the power measurement portion 405. The condition setting portion 401 applies the second threshold value $Th_2$ to the battery pack 125 when information that the notebook PC 10 is not connected to the docking station 100 or that the battery pack 25 is not mounted is received from the battery controller 123, and otherwise, applies the first threshold value $Th_1$ to the battery pack 125. The condition setting portion 401 holds therein a setting value which is to be set to the pulse control portion 407 in order to reduce the power consumption when the output power P exceeds the first threshold value $Th_1$ or the second threshold value $Th_2$ applied to the battery pack 125.

Upon receiving an instruction from the mode setting portion 403 to perform charging in the pre-charging mode, the condition setting portion 401 may instruct the pulse control portion 407 change the first threshold value to a third threshold value larger than the first threshold value so that charging is performed at the current setting value It received from the battery controller 123. Moreover, the condition setting portion 401 may hold the current setting value $I_t$ and set the current setting value It held per se to the pulse control portion 407 upon receiving an instruction from the mode setting portion 403 to perform charging in the pre-charging mode. The condition setting portion 401 sets the setting value received from the battery controller 123 to the pulse control portion 407 when it has received the instruction from the mode setting portion 403 to perform charging in the standard charging mode and when it is determined that the output power P has not exceeded the first threshold value $Th_1$ or the second threshold value $Th_2$ applied to the battery pack 125.

The condition setting portion 401 sets the setting value held per se to the pulse control portion 407 to reduce the power consumption of the charger 400 as described in FIG. 4 when it has received the instruction from the mode setting portion 403 to perform charging in the standard charging mode and when it is determined that the output power P has exceeded the first threshold value $Th_1$ or the second threshold value $Th_2$ applied to the battery pack 125. The battery controller 123 delivers the setting value received from the battery pack 125 to the condition setting portion 401 of the charger 400 and delivers either one of information on the pre-charging mode or information on the standard charging mode to the mode setting portion 403 on the basis of the current setting value $I_{chg}$ received from the battery pack 125. In the notebook PC 10, by providing a charger, in place of the charger 19, having the same configuration as the charger 400, and applying the second threshold value $Th_2$ to the battery pack 25, the charger is able to receive the output power P from the power detector 127 to thereby control the charging of the battery pack 25.

As has been described, the present invention provides a method for controlling a charging system having multiple loads.

While the invention has been particularly shown and described with reference to a preferred embodiment, it will be understood by those skilled in the art that various changes in form and detail may be made therein without departing from the spirit and scope of the invention.

What is claimed is:

1. A charging system comprising:
   a power source having a predetermined rating capacity;
   a first battery pack;
   a first charger;
   a first system load coupled to said first battery pack and said first charger; and
   a controller for determining whether or not a portable computer to be charged by said charging system includes a second battery pack, wherein said portable computer includes a second charger and a second system load, wherein said controller, in response to said portable computer includes a second battery pack, permits said first and second battery packs to be charged while ensuring the power consumptions of said first and second system loads are completely met when the total power consumption of said first and second chargers and said first and second system loads is less than a first predetermined output power threshold of said power source, and
   stops said first battery pack from being charged and permits said second battery pack to be charged while ensuring the power consumptions of said first and second system loads are completely met when the total power consumption of said first and second chargers and said first and second system loads exceeds said first predetermined output power threshold but less than a second predetermined output power threshold of said power source.

2. The charging system of claim 1, wherein said controller stops said first and second battery packs from being charged while ensuring the power consumptions of said first and second system loads are completely met when the total power consumption of said first and second chargers and said first and second system loads exceeds said second predetermined output power threshold but less than said predetermined rating capacity of said power source.

3. The charging system of claim 1, wherein said controller, in response to said portable computer does not include a second battery pack, permits said first battery pack to be charged while supplying power to said first and second system loads when the total power consumption of said first and second chargers and said first and second system loads is less than said second predetermined output power threshold of said power source.

4. The charging system of claim 3, wherein said controller stops said first battery pack from being charged while supplying power to said first and second system loads when the total power consumption of said first and second chargers and said first and second system loads exceeds said second predetermined output power threshold but less than said redetermined rating capacity of said power source.

5. The charging system of claim 1, wherein said controller permits said first battery pack to be charged by supplying power to said first charger, and permits said second battery pack to be charged by supplying power to said second charger.

6. The charging system of claim 5, wherein said controller stops said first battery pack from being charged by stop supplying power to said first charger, and stops said second battery pack from being charged by stop supplying power to said second charger.

7. The charging system of claim 1, wherein said controller determines power being supplied to said system loads and said chargers according to following descending order of priority—said second system load, said first system load, said second charger and said first charger.

8. The charging system of claim 1, wherein said power source is an AC/DC adapter.

9. The charging system of claim 1, wherein said first charger includes:
   a pulse control device;
   a mode setting device for indicating a charging mode of said first battery pack; and
   a condition setting device for setting said pulse control device a value corresponding to said charging mode.

10. The charging system of claim 9, wherein said charging mode is a pre-charging mode when said first battery pack is at an initial charging stage prior to transitioning to a standard charging mode.

* * * * *